United States Patent
Boehm

(10) Patent No.: US 10,072,802 B1
(45) Date of Patent: Sep. 11, 2018

(54) APPARATUS AND METHOD FOR CONVENIENT MOBILE SOLAR CHARGED LIGHT SOURCE

(71) Applicant: Dale Lee Boehm, Runaway Bay, TX (US)

(72) Inventor: Dale Lee Boehm, Runaway Bay, TX (US)

( * ) Notice: Subject to any disclaimer, the term of this patent is extended or adjusted under 35 U.S.C. 154(b) by 0 days.

(21) Appl. No.: 15/831,841

(22) Filed: Dec. 5, 2017

Related U.S. Application Data

(60) Provisional application No. 62/480,522, filed on Apr. 2, 2017.

(51) Int. Cl.
| | |
|---|---|
| *F21L 4/04* | (2006.01) |
| *F21L 4/08* | (2006.01) |
| *H02S 40/38* | (2014.01) |
| *F21W 131/10* | (2006.01) |
| *F21W 111/02* | (2006.01) |

(52) U.S. Cl.
CPC ............... *F21L 4/04* (2013.01); *F21L 4/08* (2013.01); *H02S 40/38* (2014.12); *F21W 2111/02* (2013.01); *F21W 2131/10* (2013.01)

(58) Field of Classification Search
CPC .... F21S 9/026; F21S 8/081; F21S 9/00; F21S 8/00; F21V 17/007; H05B 37/00; F21L 4/04

USPC ........................................................ 362/183
See application file for complete search history.

(56) References Cited

U.S. PATENT DOCUMENTS

| | | | |
|---|---|---|---|
| 8,669,716 B2* | 3/2014 | Recker | H05B 37/0272 315/291 |
| 2008/0037243 A1* | 2/2008 | Discoe | F21S 9/026 362/183 |
| 2009/0059603 A1* | 3/2009 | Recker | H05B 37/0272 362/362 |
| 2009/0122564 A1* | 5/2009 | Beadle | F21S 8/081 362/431 |
| 2016/0341379 A1* | 11/2016 | Hoffman | F21V 17/007 |
| 2016/0348863 A1* | 12/2016 | Toner | F21S 9/035 |
| 2018/0003353 A1* | 1/2018 | Izradel | F21S 9/026 |

* cited by examiner

*Primary Examiner* — Daniel Hess
(74) *Attorney, Agent, or Firm* — Eldredge Law Firm, LLC; Richard Eldredge

(57) ABSTRACT

A mobile solar charged light source system includes a lighting apparatus to be secured to a pre-determined location within a user's yard or house, the lighting apparatus having a body; and a top attached to the body and to provide an opening to a cavity, the top having one or more solar panels secured to a top surface of the top; a removable light source having a housing to be removably secured within the cavity, the removable light source having a battery to receive charge from the one or more solar panels; and a light in electrical communication with the battery; the removable light source can be removed from the lighting apparatus to be used as an emergency light source.

16 Claims, 7 Drawing Sheets

APPARATUS AND METHOD FOR CONVENIENT MOBILE SOLAR CHARGED LIGHT SOURCE

BACKGROUND

1. Field of the Invention

The present invention relates generally to light source systems, and more specifically, to an apparatus and method for mobile solar charged light source.

2. Background

Optimally, the power will never fail and grid connected lighting will be available for all situations. Unfortunately, many times and without warning, connected lighting sources are disrupted by disruptions in the electric grid's integrity in the distribution, transmission, or generation systems that provide power for standard lighting.

Though most homes have access to emergency light sources, such as flash lights and candles, they are can be difficult to locate once the power is out. In addition, candles can have extreme flame hazards, are difficult to light and place in a safe location, and have been show to produce various types of toxic fumes. Additionally, candles must be continually monitored as they encourage the young to play games with the open flame, hot waxes, and oils.

Flashlights are also commonly used in the event of a power outage. However, flashlights are generally lost in a drawer or contain dead batteries. Flashlights must therefore be checked for location and function on a regular basis. Even then, flashlights are often non-functional when needed or only last for a few minutes before the batteries are drained.

Accordingly, although great strides have been made in the area of emergency lighting systems, many shortcomings remain. There is a need for a lighting system that is convenient, safe, easy to locate, and deploy.

SUMMARY OF THE INVENTION

The present invention relates to a solar powered lighting system that is both mobile and easily located, since it is designed to either be an easily decoupled component or in-whole use of solar powered yard, walkway, or accent lighting converted for safe use as emergency in-door lighting.

In the present invention, when configured to allow for decoupled use, the battery, light source, and electrical components will be constructed such that they can easily be removed in one unit without damage to the overall original light. The removed components can be constructed to have the light emission on the end like that of a flashlight or from the middle. It may also have shapes or angles either movable or stationary constructed into it to allow for aiming the emitted light in any desired direction when placed on a surface, such as a table, entertainment center, dresser, or counter top. Additionally, components to allow for adjustment of focus may be included. The removed components may also have strings or straps for use in hanging from items such as ceiling fans, lamps, or chandeliers, with or without hooks. It is envisioned that the batteries of the removed components may be charged by a connected power supply other than a dedicated solar panel.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
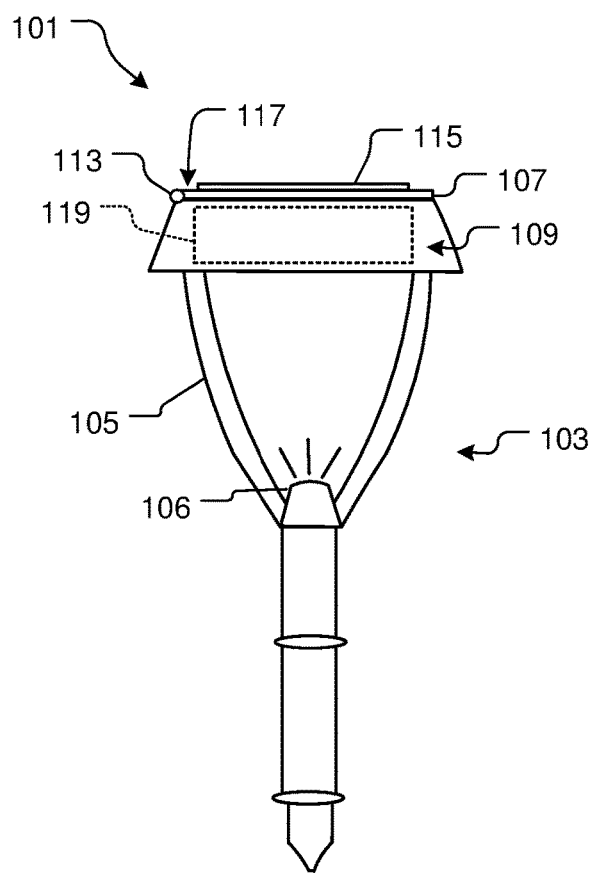
FIGS. 1A and 1B are side views of a mobile solar charged light source apparatus in accordance with a first embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional emergency lighting systems. Specifically, the present invention provides a convenient and mobile solar charged light source to be used daily as dusk to dawn garden or pathway accent lighting, converted for indoor use in emergencies. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
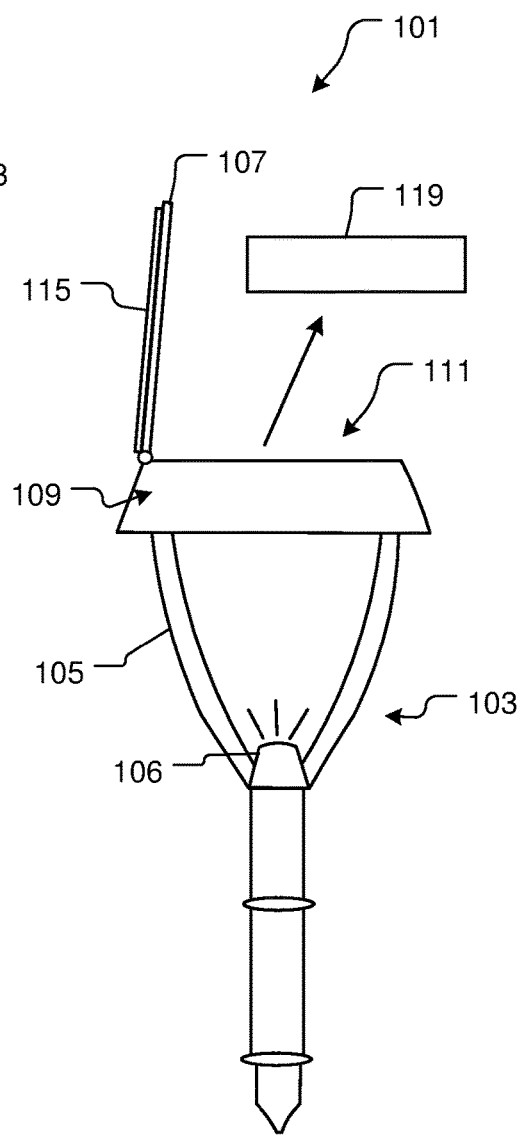

Referring now to the drawings wherein like reference characters identify corresponding or similar elements throughout the several views, FIGS. 1A and 1B depict side views of a mobile solar charged light source system in accordance with a preferred embodiment of the present application. It will be appreciated that system 101 overcomes one or more of the above-listed problems commonly associated with conventional emergency light source systems.

In the contemplated embodiment, system 101 includes a lighting apparatus 103 having a body 105. It should be appreciated that the lighting apparatus could have various shapes and sizes, including a lighting apparatus to be secured within the ground by a stake (as shown in FIGS. 1,2,4 and 5), a lighting apparatus to be secured to a wall, a standalone lighting apparatus, or a variety of other devices. Apparatus can optionally include a light 106 secured within body 105.

Apparatus 103 further includes a top 107 attached to body 105 and configured to provide access to a cavity 109 through an opening 111. As shown in FIGS. 1A and 1B, top 107 is pivotally attached to body 105 via a pivoting device 113, however, it is contemplated that a variety of attachments could be used. One or more solar panels 115 are secured to a top surface 117 of top 107, however, it is contemplated that solar panels 115 could be placed in alternate locations and that the batteries may be charged by a connected power supply other than a dedicated solar panel.

System 101 further includes a removable light source 119 configured to be removably secured within cavity 109 and in electrical communication with the one or more solar panels 115. As shown in FIG. 1B, source 119 is removable via opening 111 when top 107 is in an open position. It should be appreciated that this feature allows for independent use of source 119.

Figures 2A, 2B:
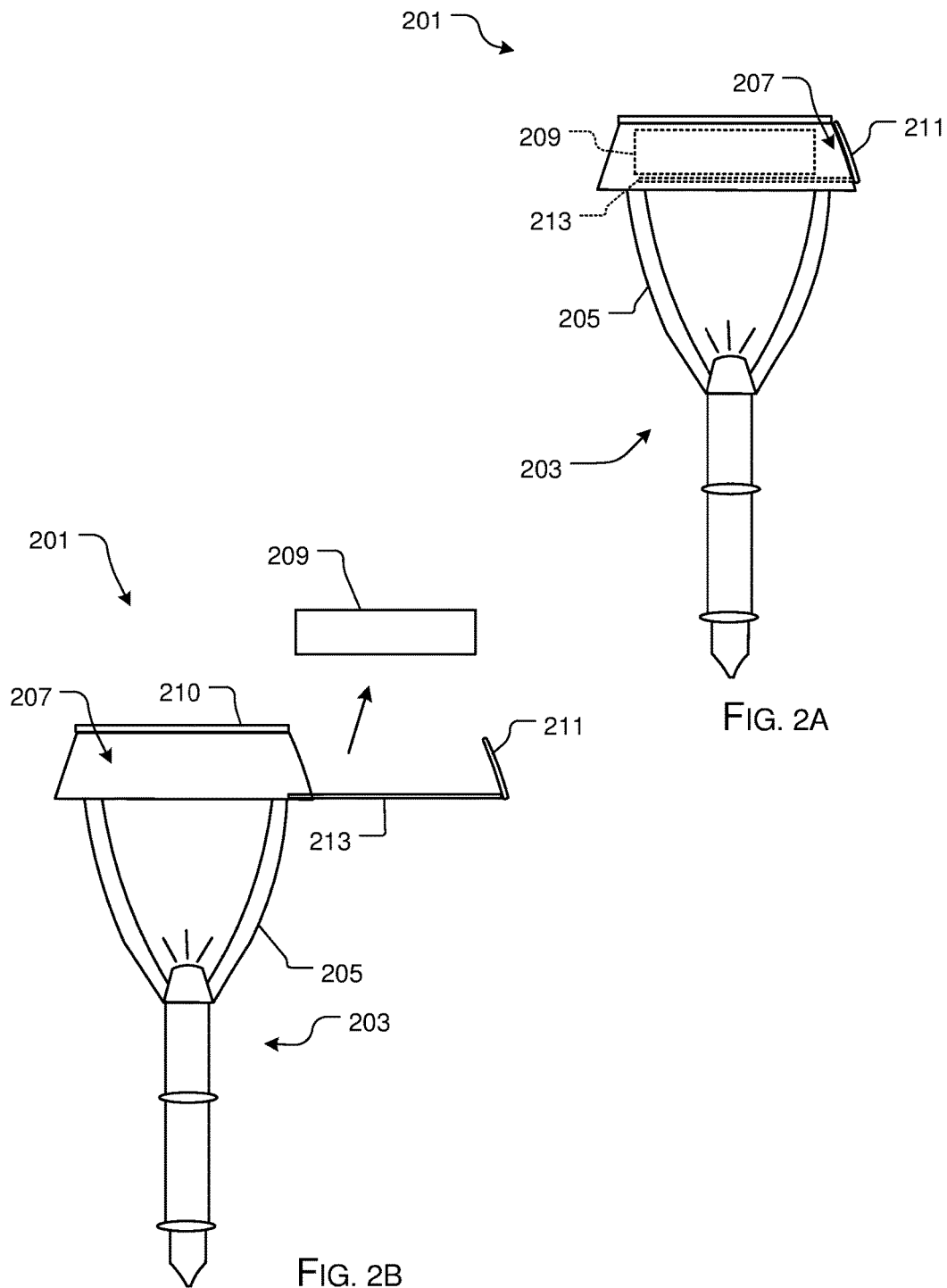
FIGS. 2A and 2B are side views of a mobile solar charged light source apparatus in accordance with a second embodiment of the present application.

In FIGS. 2A and 2B, an alternate embodiment of a mobile solar charged light source system 201 is shown. System 201 includes similar features to system 101, including a lighting apparatus 203 having a body 205 with a cavity 207 disposed therein to receive a removable light source 209. Source 209 is configured to be in electrical communication with one or more solar panels 210 secured to body 205. In this embodiment, apparatus 203 includes a sliding device 211 having a platform 213 configured to hold source 209. Sliding platform 213 may be part of the light housing removed with the light 209 or remain with body 205. Sliding device 211 is configured to extend from cavity 207, thereby providing access to source 209, as shown in FIG. 2B.

Figure 3A:
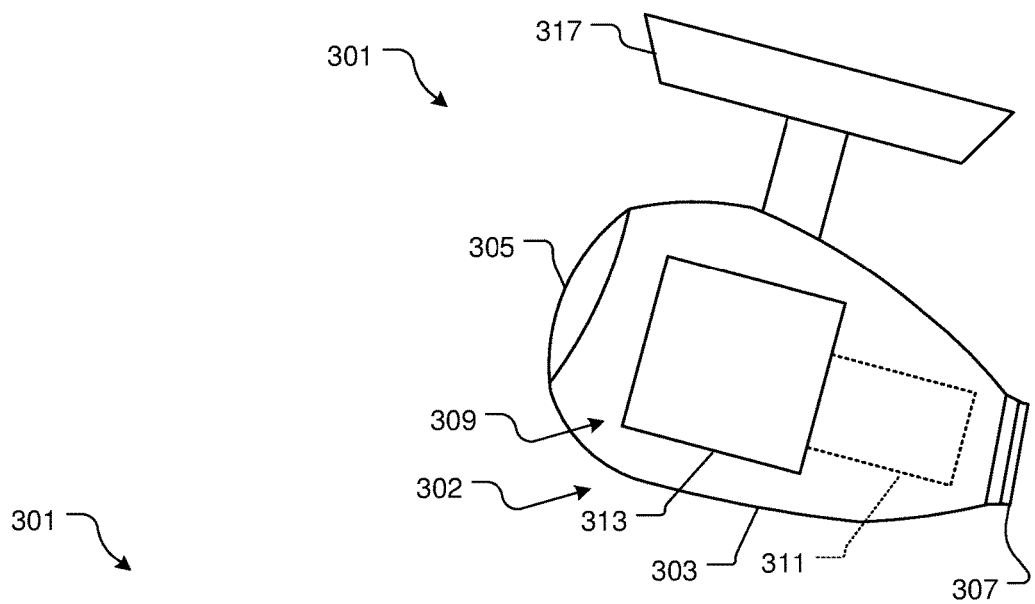
FIGS. 3A and 3B are side views a mobile solar charged light source apparatus in accordance with a third embodiment of the present application.
Figure 3B:
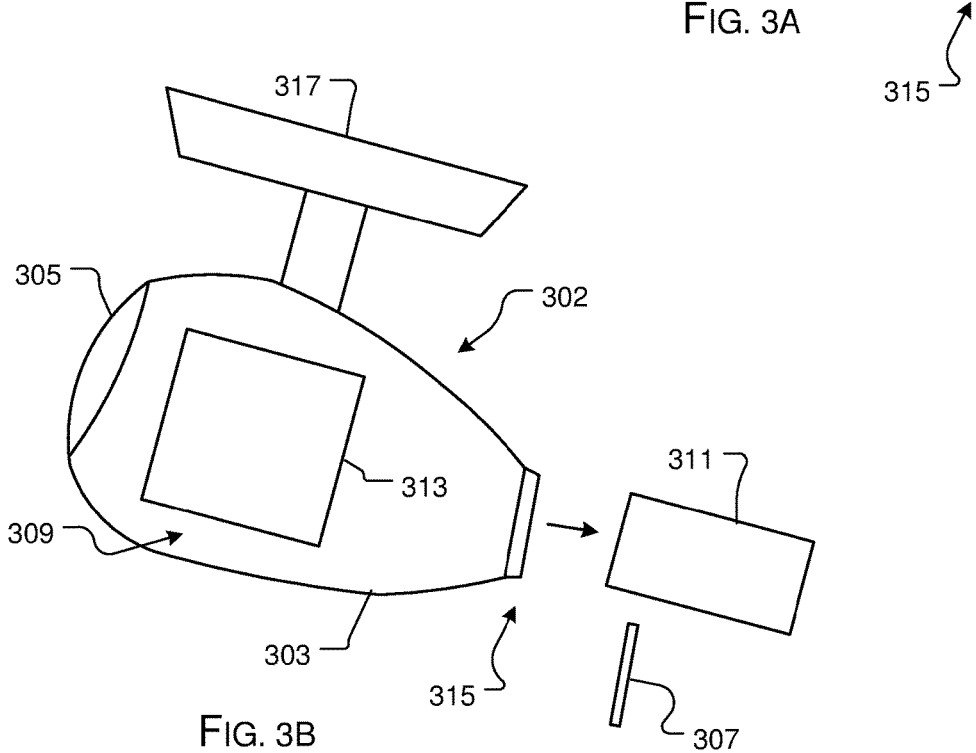

In FIGS. 3A and 3B, an alternative embodiment of a mobile solar charged light source system 301 is shown. System 301 is similar in form and function to system 101 and system 201. System 301 includes a lighting apparatus 302 having an elongated body 303 with a front lens 305 and a removable back 307 configured to provide access to a cavity 309 wherein a removable light source 311 is secured. One or more solar panels 313 are secured to an exterior of body 303 and in electrical communication with source 311. As shown in FIG. 3B, source 311 is removable from a back end 315 of body 303 for independent use. Apparatus 302 can further include a mount 317 configured to provide a means to secure system 301 to a wall or other structure.

Figures 4A, 4B:
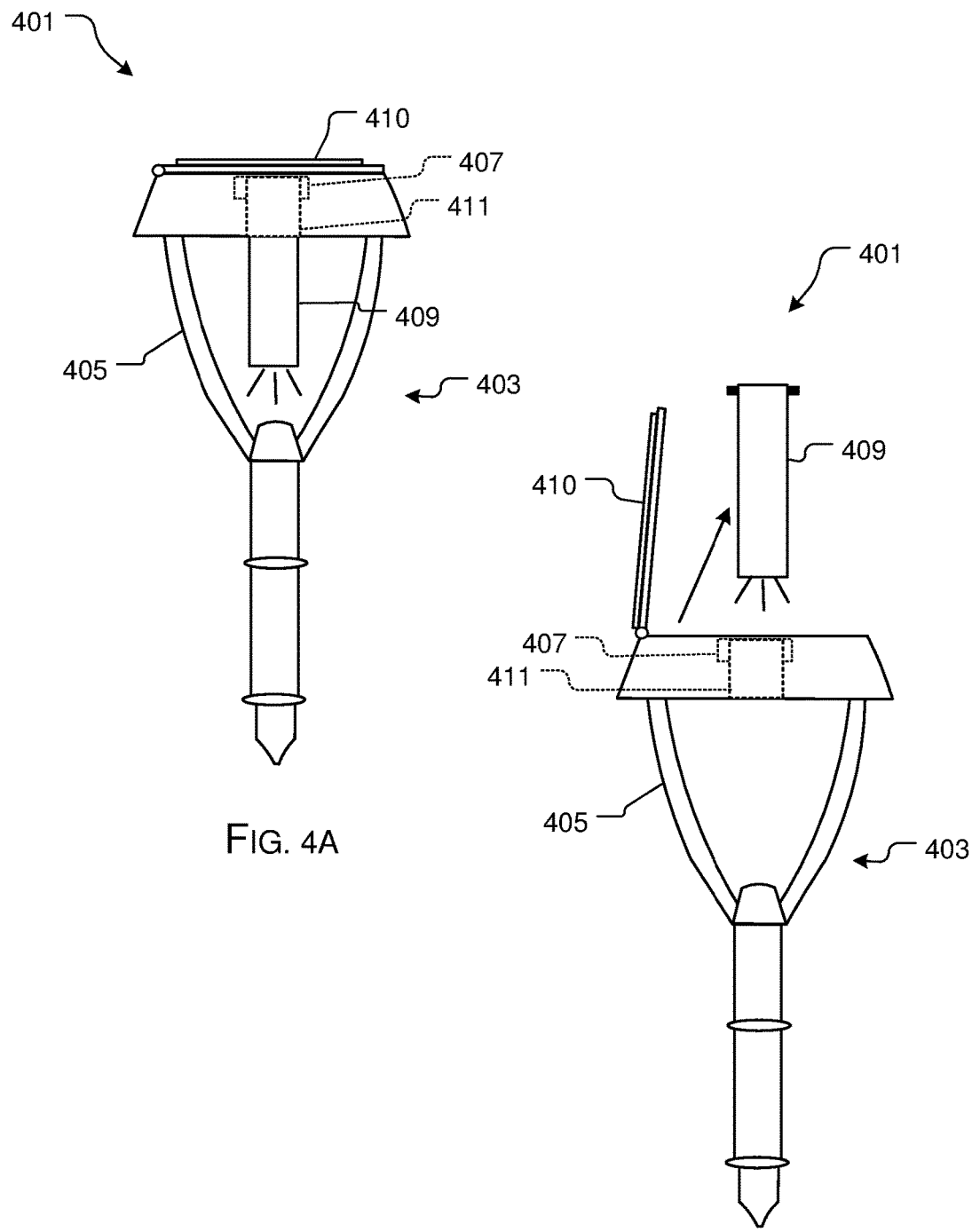
FIGS. 4A and 4B are side views of a mobile solar charged light source apparatus in accordance with a fourth embodiment of the present application.

In FIGS. 4A and 4B, an alternate embodiment of a mobile solar charged light source system 401 is shown. System 401 includes similar features to system 101, including a lighting apparatus 403 having a body 405 with a receptacle 407 to secure a removable light source 409. Source 409 is configured to be in electrical communication with one or more solar panels 410 secured to body 405. In this embodiment, apparatus 403 includes an opening 411 configured to allow source 409 to protrude into body 405. Receptacle 407 is configured to allow removal of 409 from body 405, thereby providing access to source 409, as shown in FIG. 4B.

Figures 5A, 5B:
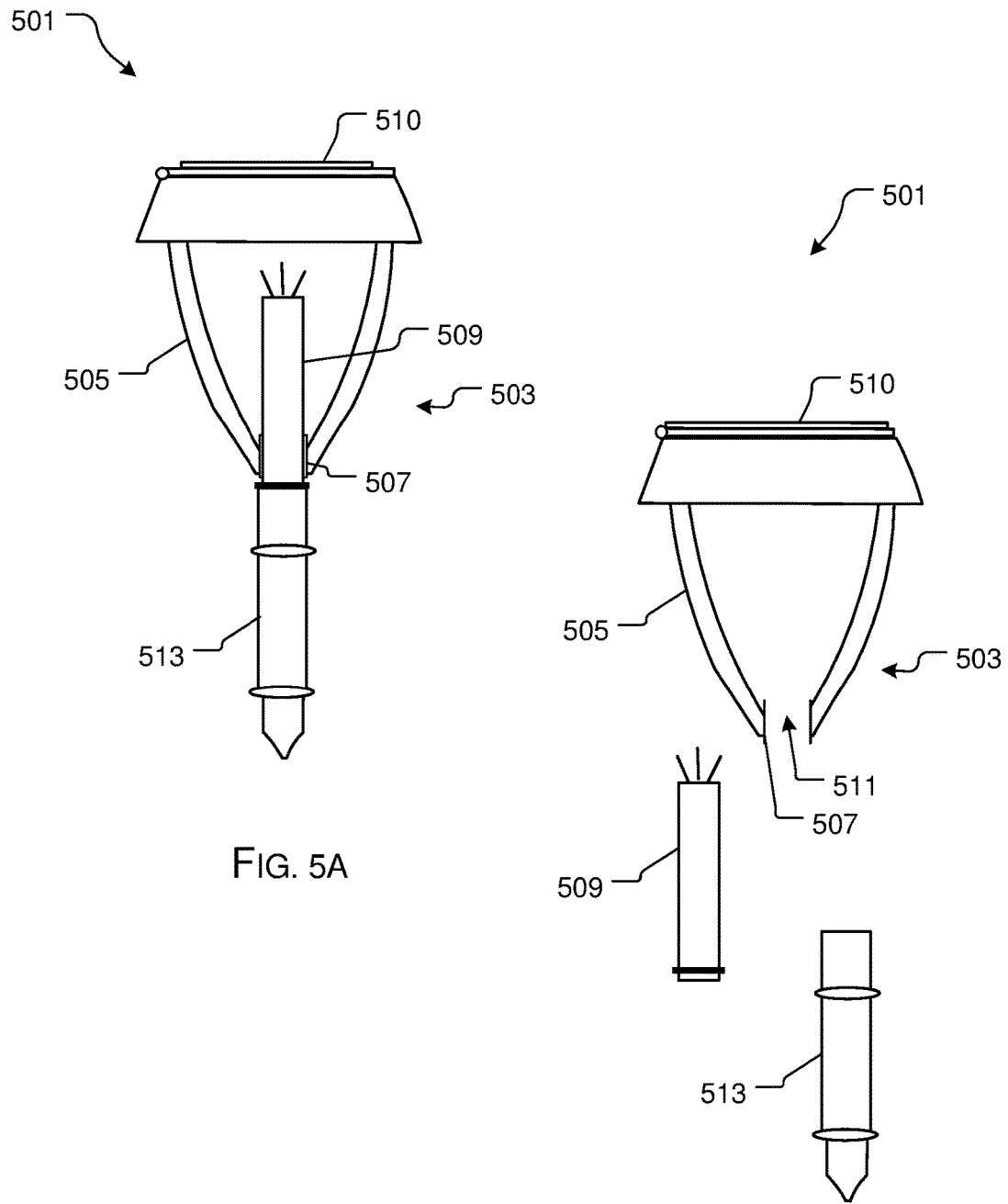
FIGS. 5A and 5B are side views a mobile solar charged light source apparatus in accordance with a fifth embodiment of the present application.

In FIGS. 5A and 5B, an alternate embodiment of a mobile solar charged light source system 501 is shown. System 501 includes similar features to system 101, including a lighting apparatus 503 having a body 505 with a receptacle 507 to secure a removable light source 509. Source 509 is configured to be in electrical communication with one or more solar panels 510 secured to body 505. In this embodiment, apparatus 503 includes an opening through the bottom 511 configured to allow source 509 to protrude into body 505. Removal of stand stem 513 allows for access to receptacle 507. Receptacle 507 is configured to allow removal of 509 from body 505, thereby providing access to source 509, as shown in FIG. 5B.

It should be appreciated that one of the unique features believed characteristic of the present application is the removable light source. It should be understood that the necessary electrical components are included in systems 101, 201, 301, 401 and 501 to provide a means for the removable light source to receive power from the solar panels. This feature allows for a household to have an emergency light source in a known location, wherein the light source is constantly charged. This feature solves the problems commonly associated with conventional emergency lighting sources.

Figure 6:
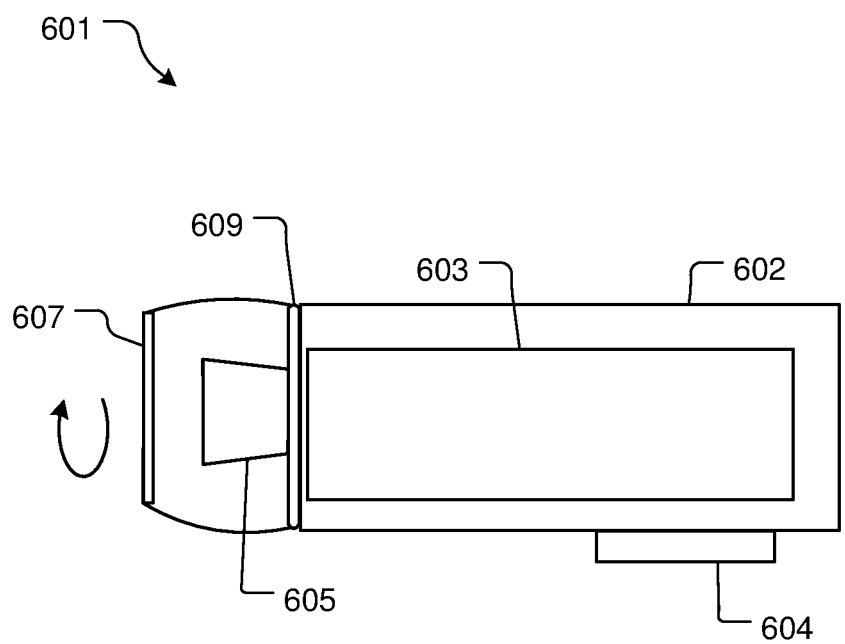
FIG. 6 is a simplified schematic of the components of the mobile solar charged light source apparatuses of FIGS. 1-5.

In FIG. 6, a simplified schematic demonstrates the features contemplated for a removable light source 601. It should be understood that the features discussed herein are not exhaustive, and source 601 could include additional electrical components and other features commonly known in the art. Source 601 includes a housing 602 with a battery 603 configured to receive a charge from the one or more solar panels. Housing 602 can further include an activation switch 604 in communication with battery 603, the battery 603 being in electrical communication with a light 605 and configured to power the light 605. Source 601 can further include one or more lenses 607, the one or more lenses configured to provide focus, color, light concentration, or a plurality of other features. In addition, it is contemplated that light 605 can be secured to or within housing 602 via a pivoting connection 609, thereby allowing for light 605 to be pointed in various directions.

Figure 7:
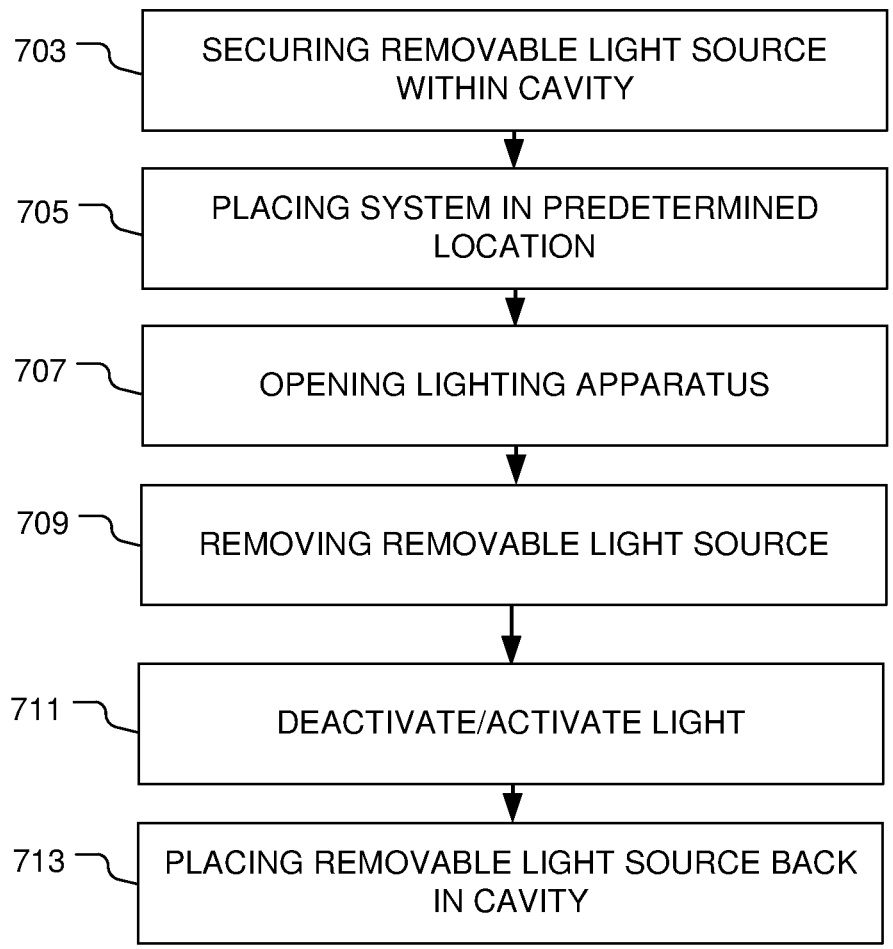
FIG. 7 is a flowchart of the method of use associated with the apparatuses of FIGS. 1-5.

In FIG. 7, a flowchart 701 depicts a method of use associated with the various systems discussed above. A user secures the removable light source within the cavity, wherein the battery of the removable light source is charged via the one or more solar panels, as shown with box 703. The system is placed in a predetermined location, to allow for charging and prevent the user from forgetting where the system is located, as shown with box 705. The auto on at dusk offered by standard garden and pathway accent lighting allows for the dual purpose daily use of the light, as well as assisting in location during power outages. In the event of an emergency, the user opens the lighting apparatus and removes the removable light source, as shown with boxes 707, 709. The user can then activate and use the light as necessary during the emergency, as shown with box 711. Once the user no longer needs the light source, the source can be returned to the cavity to be charged and stored for the next use, as shown with box 513.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile solar charged light source system, comprising:
    a lighting apparatus configured to be secured to a predetermined location within a user's yard or house, the lighting apparatus having:
        a body; and
        a top attached to the body and configured to provide an opening to a cavity, the top having one or more solar panels secured to a top surface of the top;
    a removable light source having a housing configured to be removably secured within the cavity, the removable light source having:
        one or more batteries configured to receive charge from the one or more solar panels;
        one or more lights in electrical communication with the one or more batteries and
        a controller configured to illuminate the one or more lights upon no input from the solar panels;
    wherein the removable light source can be removed from the lighting apparatus to be used as an emergency light source.

2. The system of claim 1, wherein the removable light source further comprises:
    an activation switch configured to activate and/or deactivate the light;
    wherein the activation switch is configured to be moved into the activate position when installed in the body of the lighting apparatus.

3. The system of claim 1, wherein the top is pivotally attached to the body, thereby allowing the top to open via a pivot point, thereby providing access to the cavity and the removable light source.

4. The system of claim 1, wherein the top further comprises a sliding device having a platform configured to slide in and out of the cavity, wherein the platform holds the removable light source.

5. The system of claim 1, wherein the bottom further comprises a securing receptacle accessible after removal of stake stem, wherein the removable light source can be extracted.

6. The system of claim 1, wherein the one or more lights of the removable light source is secured within the housing via a pivoting point, thereby allowing the light to pivot and point in multiple directions.

7. The system of claim 1, wherein the one or more lights of the removable light source includes a focus lens.

8. The system of claim 1, wherein the lighting apparatus is a yard light having a stake configured to be inserted into a ground surface.

9. The system of claim 1, wherein the lighting apparatus is configured to secure to a wall of a building.

10. A method of transforming solar powered yard, garden, pathway and accent lighting for use as an emergency light source, the method comprising:
    providing the system of claim 1;
    securing the removable light source within the cavity, wherein the removable light source receives power from the one or more solar panels;
    placing the system in a predetermined location;
    opening the lighting apparatus to have access to the cavity;
    removing the removable light source from cavity; and
    deactivate/activating the removable light source as desired;
    wherein the system provides light dusk to dawn daily and the removable light source provides light in an emergency situation.

11. The method of claim 10, further comprising:
    placing the removable light source back into the cavity; and
    placement of the removable light source back into the cavity configures the light such that it is activated;
    wherein the removable light source and batteries are connected to the one or more solar panels to receive power.

12. A mobile solar charged light source system, comprising:
    a lighting apparatus having:
        an elongated body with a removable back configured to provide access to a cavity within the elongated body; and
        a lens at a front of the elongated body through which light is emitted; and
        one or more solar panels secured to an exterior surface;
    a removable light source having a housing configured to be removably secured within the cavity, the removable light source having:
        one or more batteries configured to receive charge from the one or more solar panels; and
        one or more lights in electrical communication with the one or more batteries;
    wherein the removable light source can be removed from the lighting apparatus to be used as an emergency light source.

13. The system of claim 12, wherein the removable light source further comprises:
    an activation switch configured to deactivate and activate the light.

14. The system of claim 12, wherein the light of the removable light source is secured within the housing via a pivoting point, thereby allowing the light to pivot and point in multiple directions.

15. The system of claim 12, wherein the light of the removable light source includes a focus lens.

16. The system of claim 12, wherein the batteries are charged from a grid connected power supply other than that of a dedicated solar panel.

\* \* \* \* \*